(12) United States Patent
Ihara (10) Patent No.: US 8,562,695 B2
(45) Date of Patent: Oct. 22, 2013

(54) SOLID ELECTROLYTIC CAPACITOR AND A METHOD FOR MANUFACTURING THE SAME

(71) Applicant: Sanyo Electric Co., Ltd., Moriguchi (JP)

(72) Inventor: Hayatoshi Ihara, Kyotanabe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/730,302

(22) Filed: Dec. 28, 2012

(65) Prior Publication Data

US 2013/0111720 A1    May 9, 2013

Related U.S. Application Data

(62) Division of application No. 12/851,993, filed on Aug. 6, 2010, now abandoned.

(30) Foreign Application Priority Data

Aug. 27, 2009   (JP) .................................. 2009-196269

(51) Int. Cl.
   *H01G 9/00*   (2006.01)

(52) U.S. Cl.
   USPC ........................................................ 29/25.03

(58) Field of Classification Search
   None
   See application file for complete search history.

(56) References Cited

U.S. PATENT DOCUMENTS

| | | | |
|---|---|---|---|
| 3,818,581 A | 6/1974 | Vartanian et al. |
| 6,243,256 B1 | 6/2001 | Furuta et al. |
| 6,808,541 B2 | 10/2004 | Maeda |
| 7,295,426 B2 | 11/2007 | Ihara |
| 7,929,274 B2 | 4/2011 | Reed et al. |
| 8,000,086 B2 | 8/2011 | Okada et al. |
| 8,072,735 B2 | 12/2011 | Fujii et al. |
| 2004/0017645 A1 | 1/2004 | Arai et al. |
| 2004/0233616 A1 | 11/2004 | Arai et al. |
| 2007/0279841 A1 | 12/2007 | Kim et al. |
| 2010/0142125 A1 | 6/2010 | Kim et al. |

FOREIGN PATENT DOCUMENTS

| | | |
|---|---|---|
| JP | 2005-5522 A | 1/2005 |
| JP | 2006-161673 A | 6/2006 |
| JP | 2007-81069 A | 3/2007 |
| JP | 2008-091784 A | 4/2008 |
| JP | 2008-187091 A | 8/2008 |

OTHER PUBLICATIONS

Japanese Office Action dated May 21, 2013, issued in corresponding Japanese Patent Application No. 2009-196269, w/ English translation.

*Primary Examiner* — Seahvosh Nikmanesh (74) *Attorney, Agent, or Firm* — Westerman, Hattori, Daniels & Adrian, LLP (57) ABSTRACT

A method of manufacturing a solid electrolytic capacitor includes steps (a) to (d). The step (a) forms at least two punched apertures in a metal plate, thereby forming a rung section between adjacent two of the punched apertures, the rung section having surfaces as a pair appearing as a result of formation of the punched apertures. The step (b) cuts the rung section out of the metal plate to form a pad member, the length of the rung section corresponding to a distance between the surfaces being determined to be the height of the pad member. The step (c) mounts the pad member on an anode terminal such that one of the surfaces faces the anode terminal. The step (d) electrically connects an anode section of a capacitor element to the other of the surfaces and electrically connects a cathode section of the capacitor element to the cathode terminal.

3 Claims, 5 Drawing Sheets

SOLID ELECTROLYTIC CAPACITOR AND A METHOD FOR MANUFACTURING THE SAME

CROSS-REFERENCE TO RELATED APPLICATIONS

This application is a divisional of U.S. application Ser. No. 12/851,993, filed on Aug. 6, 2010 which is based upon and claims the benefit of priority from the prior Japanese application Number 2009-196269, filed Aug. 27, 2009, the entire contents of which are incorporated herein by reference.

BACKGROUND OF THE INVENTION

1. Field of the Invention

The present invention relates to a solid electrolytic capacitor and a method for manufacturing same, and particularly to a solid electrolytic capacitor in which an anode section of a capacitor element is electrically connected to an anode terminal through a pad member and a method for manufacturing same.

2. Description of Related Art

Figure 9:
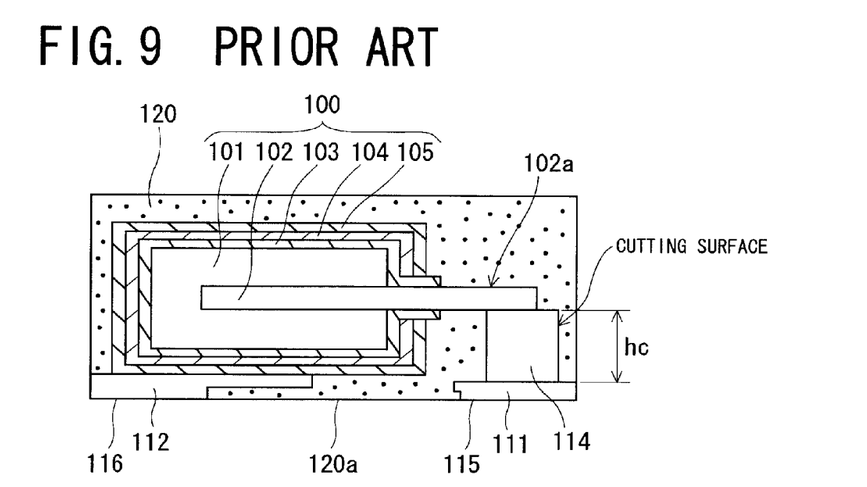
FIG. 9 is a cross sectional view showing a conventional solid electrolytic capacitor.

FIG. 9 is a cross sectional view of a conventional solid electrolytic capacitor. As shown in FIG. 9, the conventional solid electrolytic capacitor comprises a solid electrolyte type capacitor element 100, an anode terminal 111, and a cathode terminal 112, which are buried in an enclosure resin 120. The capacitor element 100 has an anode body 101 in which an anode lead 102 is planted, a dielectric layer 103 formed on a surface of the anode body 101, an electrolyte layer 104 formed on the dielectric layer 103, and a cathode layer 105 formed on the electrolyte layer 104.

The anode terminal 111 and the cathode terminal 112 include an anode terminal surface 115 and a cathode terminal surface 116, respectively, which are exposed on a lower surface 120a of the enclosure resin 120. To a surface of the anode terminal 111 on the opposite side to the anode terminal surface 115, joined electrically is a pad member 114 by welding means such as laser welding. A tip end part 102a of the anode lead 102 of the capacitor element 100 is electrically connected to a tip end part of the pad member 114. To a surface of the cathode terminal 112 on the opposite side to the cathode terminal surface 116, electrically connected is a part of a surface of the cathode layer 105 of the capacitor element 100. The pad member has a rectangular parallelepiped shape or columnar shape.

Figure 10A:
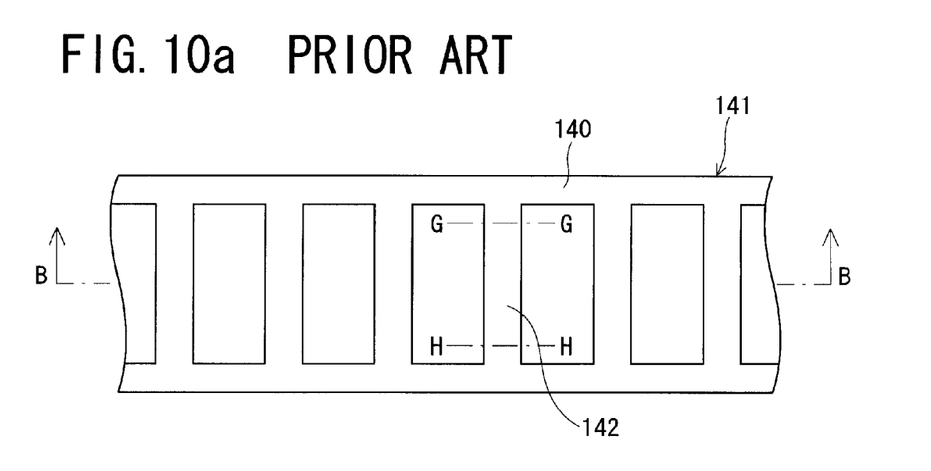
FIG. 10a is a plan view for explaining a step of producing a pad member of the conventional solid electrolytic capacitor.
Figure 10B:
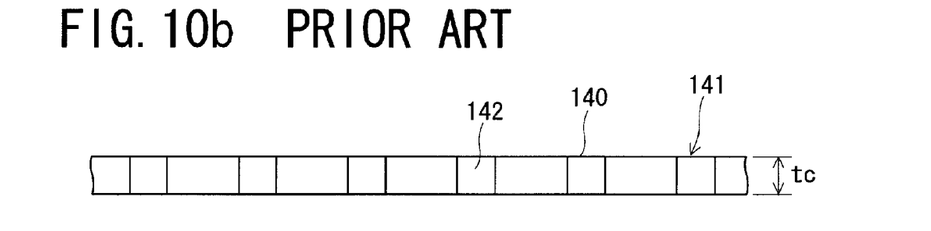

Conventionally, the rectangular parallelepiped pad member 114 is made by, as shown in FIGS. 10a and 10b, performing a punching process on a metal plate 140 which has a thickness tc equal to a height hc (cf. FIG. 9) of the pad member 114 to form a ladder plate member 141, and thereafter cutting the ladder plate member 141 along the line G-G and the line H-H to cut out a rung section 142.

However, in the conventional solid electrolytic capacitor, the rung section 142 (the pad member) is joined to the surface of the anode terminal 111 with its thickness direction directed in a direction perpendicular to the surface of the anode terminal 111. Therefore, the thickness tc of the metal plate 140 corresponds to the height hc of the pad member 114 of the capacitor element. Accordingly, in order to change the height hc of the pad member 114, the thickness tc of the plate 140 to be prepared must be changed, and thus the height hc of the pad member 114 cannot be changed easily.

In the pad member 114 which is joined to the surface of the anode terminal 111 as described above, all side surfaces of the pad member 114 are formed by cutting surfaces produced by the punching process and the cutting out of the rung section 142. Thus the joint surface of the pad member 114 joined to the anode terminal 111 and the joint surface of the pad member 114 joined to the anode lead 102 are not formed by the cutting surfaces.

SUMMARY OF THE INVENTION

In view of the above described problems, an object of the present invention is to provide a solid electrolytic capacitor in which the height of the pad member can be changed easily and a method for manufacturing same.

A first solid electrolytic capacitor according to the present invention comprises a solid electrolyte type capacitor element including a dielectric layer intervening between an anode section and a cathode section, an anode terminal connected electrically to the anode section of the capacitor element through a pad member, and a cathode terminal connected electrically to the cathode section of the capacitor element. Here, the pad member is formed by performing a cutting process on a metal plate. The pad member includes a cutting surface produced by the cutting process, and the cutting surface forms a joint surface joined to the anode section of the capacitor element and a joint surface joined to the anode terminal.

The pad member of the first solid electrolytic capacitor described above is formed by performing the cutting process on the metal plate to form a pad forming member having a width equal to a height of the pad member, and thereafter joining the pad forming member to a surface of the anode terminal with its width direction directed in a direction perpendicular to the surface of the anode terminal. Therefore, the width of the pad forming member corresponds to a height of the pad member of the solid electrolytic capacitor. The pad member thus formed has a cutting surface which is produced by the cutting process, and a partial area of the cutting surface is joined to the surface of the anode terminal. Also, another area of the cutting surface positioned on the opposite side to the partial area forms a joint surface joined to the anode section of the capacitor element.

Accordingly, the height of the pad member can be changed only by changing the width of the pad forming member which is produced from the metal plate, and it is not necessary to change the thickness of the metal plate. Therefore, in the first solid electrolytic capacitor described above, a height of the pad member can be changed easily, compared to the conventional solid electrolytic capacitor in which it is necessary to change the thickness of the metal plate in order to change the height of the pad member.

A second solid electrolytic capacitor according to the present invention is the first solid electrolytic capacitor described above, wherein the pad member is formed by performing a punching process on the metal plate to form a ladder plate member, and thereafter cutting a rung section out from the ladder plate member, the pad member includes a pair of cutting surfaces produced by the punching process, and the cutting surfaces form a joint surface joined to the anode section of the capacitor element and a joint surface joined to the anode terminal respectively.

A third solid electrolytic capacitor according to the present invention is the first or second solid electrolytic capacitor described above, wherein a width of the pad member in a direction from the anode terminal toward the cathode terminal is smaller than a height of the pad member.

In the third solid electrolytic capacitor described above, since the width of the pad member is small, a space factor of the capacitor element improves in the solid electrolytic capacitor.

A first method for manufacturing a solid electrolytic capacitor according to the present invention comprises a forming step, a joining step, and a mounting step. Here, the solid electrolytic capacitor comprises a solid electrolyte type capacitor element including a dielectric layer intervening between an anode section and a cathode section, an anode terminal connected electrically to the anode section of the capacitor element through a pad member, and a cathode terminal connected electrically to the cathode section of the capacitor element.

In the forming step, a cutting process is performed on a metal plate to form a pad forming member which is to be the pad member. Here the pad forming member has a width in a direction perpendicular to a thickness direction of the plate equal to a height of the pad member.

In the joining step, after performing the forming step, the pad forming member is joined to a surface of the anode terminal with its width direction directed in a direction perpendicular to the surface of the anode terminal.

In the mounting step, after performing the joining step, the capacitor element is mounted on the anode terminal and the cathode terminal, the anode section of the capacitor element is connected to a tip end surface of the pad forming member, and the cathode section of the capacitor element is connected to the cathode terminal.

According to the first manufacturing method described above, the width of the pad forming member corresponds to a height of the pad member of the manufactured solid electrolytic capacitor. Accordingly, the height of the pad member can be changed only by changing the width of the pad forming member which is produced from the metal plate, and it is not necessary to change the thickness of the metal plate. Therefore, a height of the pad member can be changed easily, compared to the conventional solid electrolytic capacitor in which it is necessary to change the thickness of the metal plate in order to change the height of the pad member.

A second method for manufacturing a solid electrolytic capacitor according to the present invention is the first manufacturing method described above, wherein in the forming step, the pad forming member is formed by performing a punching process on the metal plate to form a ladder plate member, and thereafter cutting a rung section out from the ladder plate member.

A third method for manufacturing a solid electrolytic capacitor according to the present invention is the first or second manufacturing method described above, wherein the pad forming member produced in the forming step has a thickness smaller than the width, and in the joining step, the pad forming member is joined to the surface of the anode terminal with its width direction directed in a direction perpendicular to the surface of the anode terminal and its thickness direction directed in a direction from the anode terminal toward the cathode terminal.

According to the third manufacturing method described above, the thickness and the width of the pad forming member correspond, respectively, to the width in a direction from the anode terminal toward the cathode terminal and the height of the pad member of the manufactured solid electrolytic capacitor.

BRIEF DESCRIPTION OF THE DRAWINGS

FIG. 3b is a cross sectional view taken along the line A-A shown in FIG. 3a;

FIG. 10b is a cross sectional view taken along the line B-B shown in FIG. 10a.

DETAILED DESCRIPTION OF THE PREFERRED EMBODIMENT

A preferred embodiment of the present invention is discussed in detail below with reference to drawings.

Figure 1:
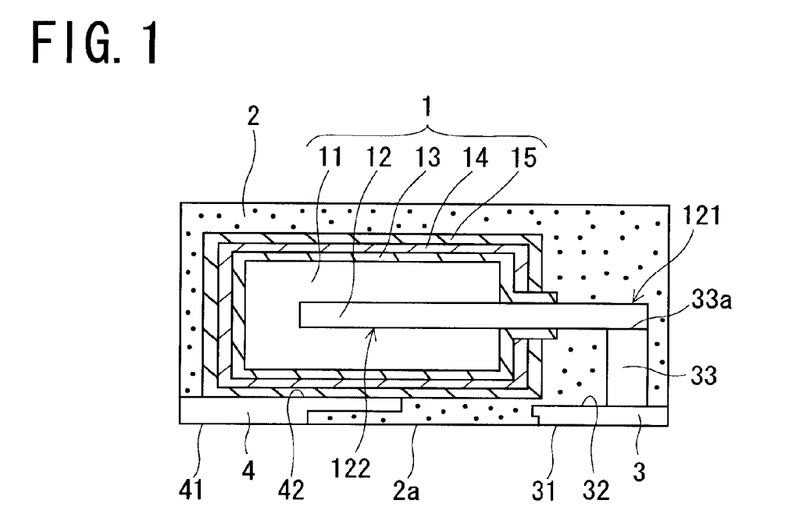
FIG. 1 is a cross sectional view showing a solid electrolytic capacitor in accordance with an embodiment of the present invention.

FIG. 1 is a cross sectional view showing a solid electrolytic capacitor in accordance with an embodiment of the present invention. As shown in FIG. 1, the solid electrolytic capacitor of this embodiment comprises a capacitor element 1, an anode terminal 3, and a cathode terminal 4, which are buried in an enclosure resin 2. The capacitor element 1 is lead type and electrolyte type.

The capacitor element 1 has an anode body 11 in which an anode lead 12 is planted, a dielectric layer 13 formed on a surface of the anode body 11, an electrolyte layer 14 formed on the dielectric layer 13, and a cathode layer 15 formed on the electrolyte layer 14.

The anode body 11 is formed by a porous sintered body made of a valve metal, for which employed is a metal such as tantalum, niobium, titanium, or aluminum.

The anode lead 12 includes a base end part 122 buried in the anode body 11, and a tip end part 121 extracted from a surface of the anode body 11. The anode lead 12 is made of a valve metal which is the same kind as or different kind from the valve metal which forms the anode body 11, and the anode body 11 and the anode lead 12 are electrically connected to each other.

The dielectric layer 13 is an oxide film formed on the surface of the anode body 11, and the oxide layer is formed by immersing the anode body 11 in an electrolytic solution such as phosphate aqueous solution or adipic acid aqueous solution to oxidize the surface of the anode body 11 electrochemically (anodic oxidation).

The electrolyte layer 14 is formed on the dielectric layer 13, using an electrically-conductive inorganic material such as manganese dioxide, or an electrically-conductive organic material such as TCNQ (Tetracyano-quinodimethane) complex salt or electrically-conductive polymer.

The cathode layer 15 is formed by a carbon layer (not shown) formed on the electrolyte layer 14 and a silver paste layer (not shown) formed on the carbon layer, and the electrolyte layer 14 and the cathode layer 15 are electrically connected to each other.

In the capacitor element 1 described above, the anode body 11 and the anode lead 12 form an anode section of the capacitor element 1, while the electrolyte layer 14 and the cathode layer 15 form a cathode section of the capacitor element 1.

The anode terminal 3 and the cathode terminal 4 include an anode terminal surface 31 and a cathode terminal surface 41, respectively, which are exposed from a lower surface 2a of the enclosure resin 2. The anode terminal surface 31 and the cathode terminal surface 41 form a pair of lower surface electrodes of the solid electrolytic capacitor.

The anode terminal 3 and the cathode terminal 4 are each formed by performing a plating process on a surface of a terminal forming member (not shown) which is made of copper and is a base material of the terminals to form a plating layer (not shown) including a nickel layer, a palladium layer, and a gold layer. Various metals other than copper can be used as a material of the terminal forming member. Also, various metals other than nickel, palladium, and gold can be used as a material of the plating layer.

A pad member 33 is joined electrically to a surface 32 of the anode terminal 3 on the opposite side to the anode terminal surface 31 by welding means such as laser welding. Specifically, by performing laser welding or the like on facing surfaces of the pad member 33 and the anode terminal 3, a part of the plating layer of the anode terminal 3 and a part of the pad member 33 are melted and integrated, whereby joining the pad member 33 and the anode terminal 3 to each other electrically. The pad member 33 is formed using a metal such as iron (42 alloy), nickel, or tantalum.

Figure 2:
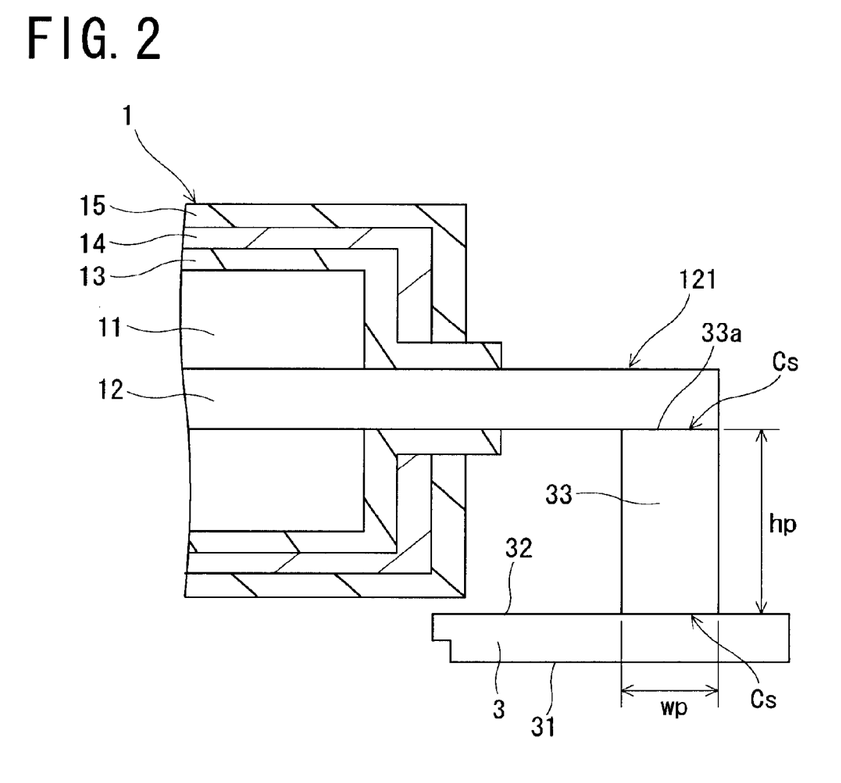
FIG. 2 is a cross sectional view showing an essential part of the solid electrolytic capacitor in an enlarged manner.

The pad member 33 is formed by performing a punching process on a metal plate 60 to form a ladder plate member 6 (cf. FIG. 3a), and thereafter cutting a rung section 61 out from the ladder plate member 6. As shown in FIG. 2, the pad member 33 includes a pair of cutting surfaces Cs, Cs produced by the punching process, and the cutting surfaces Cs, Cs form a joint surface (a tip end surface 33a of the pad member 33) joined to the tip end part 121 of the anode lead 12 of the capacitor element 1 and a joint surface joined to the anode terminal 3 respectively.

Also, in the solid electrolytic capacitor of this embodiment shown in FIGS. 1 and 2, a width wp of the pad member 33 in a direction from the anode terminal 3 toward the cathode terminal 4 is smaller than a height hp of the pad member 33.

As shown in FIG. 1, the capacitor element 1 is mounted on the anode terminal 3 and the cathode terminal 4. The tip end part 121 of the anode lead 12 of the capacitor element 1 is adhered to the tip end surface 33a of the pad member 33 by laser welding, and a part of a surface of the cathode layer 15 is bonded by a conductive adhesive to a surface 42 of the cathode terminal 4 on the opposite side to the cathode terminal surface 41. Thereby, the anode section of the capacitor element 1 is electrically connected to the anode terminal 3 through the pad member 33, and the cathode section of the capacitor element 1 is electrically connected to the cathode terminal 4 through the conductive adhesive.

A manufacturing method of the above described solid electrolytic capacitor is explained below.

Figure 3A:
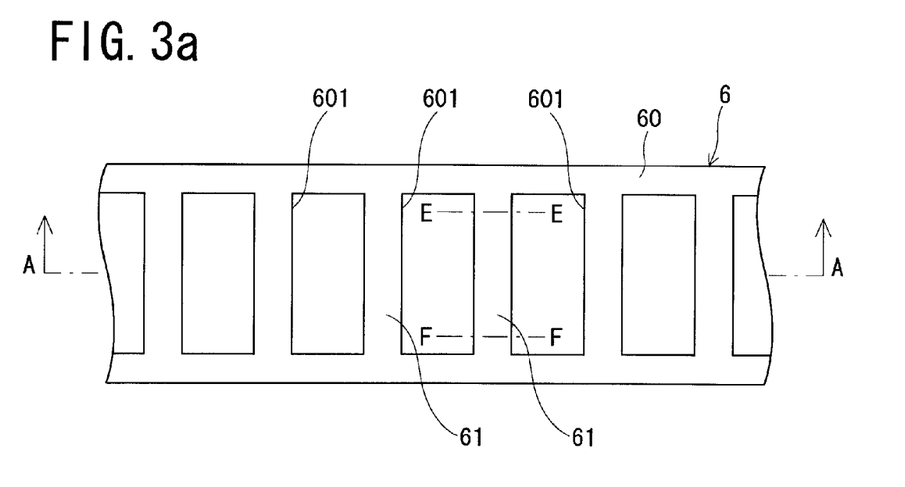
FIG. 3a is a plan view for explaining a pad forming step of a manufacturing method of the solid electrolytic capacitor.
Figure 3B:
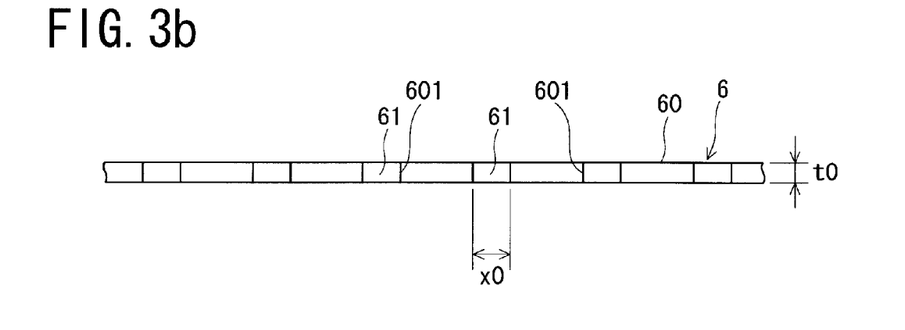
Figure 3C:
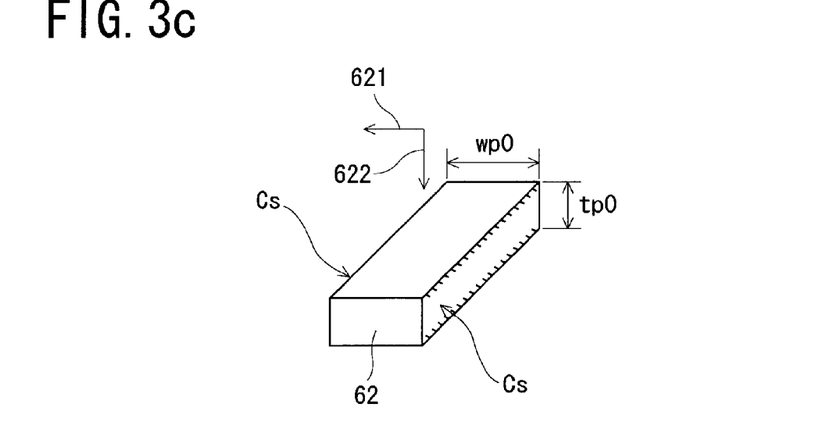
FIG. 3c is a perspective view showing a pad formation member produced in the pad forming step.

FIG. 3a is a plan view for explaining the pad forming step of the manufacturing method of the solid electrolytic capacitor, FIG. 3b is a cross sectional view taken along the line A-A shown in FIG. 3a, and FIG. 3c is a perspective view showing a pad formation member produced in the pad forming step.

As shown in FIGS. 3a and 3b, in the pad forming step, the metal plate 60 is subjected to the punching process to form a plurality of punched apertures 601 which is aligned in a row. Thereby, a ladder plate member 6 is formed, and the ladder plate member 6 includes a plurality of rung sections 61. The metal plate 60 is made of a metal such as iron (42 alloy), nickel, or tantalum.

The processing conditions of the punching process are set so that a length x0 of the rung section 61 is equal to the height hp (cf. FIG. 2) of the pad member 33. Here, the length x0 is a length of the rung section 61 in the longitudinal direction of the ladder plate member 6 to be produced in the punching process, namely in a direction from one of adjacent punched apertures 601, 601 toward the other.

In the manufacturing method in accordance with this embodiment, employed for the metal plate 60 is a plate having a thickness t0 smaller than the length x0 of the rung section 61.

After forming the ladder plate member 6, the ladder plate member 6 is cut along the lines E-E and F-F to cut out the rung section 61 as shown in FIG. 3a, thereby forming a pad forming member 62 which is to be the pad member 33 as shown in FIG. 3c. In this process, each of the rung sections 61 is fastened by a fastening apparatus (not shown) while its both ends are cut off, and therefore, the produced pad forming member 62 is kept fastened by the fastening apparatus.

By forming the pad forming member 62 in such a manner, as shown in FIG. 3c, the length x0 of the rung section 61 and the thickness t0 of the plate 60 correspond to a width wp0 and a thickness tp0 of the pad forming member 62, respectively. Therefore, the pad forming member 62 has a width equal to the height hp of the pad member 33, and a thickness smaller than the width.

Figure 4:
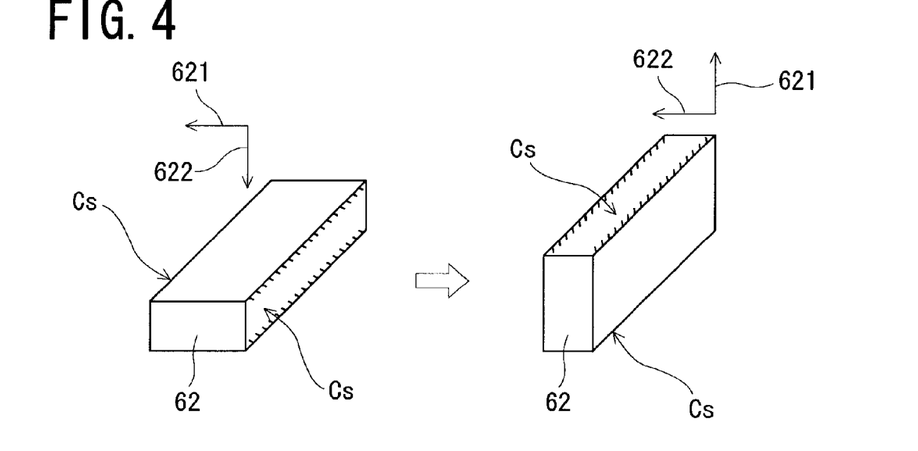
FIG. 4 is a perspective view for explaining a first phase of a joining step of the manufacturing.
Figure 5:
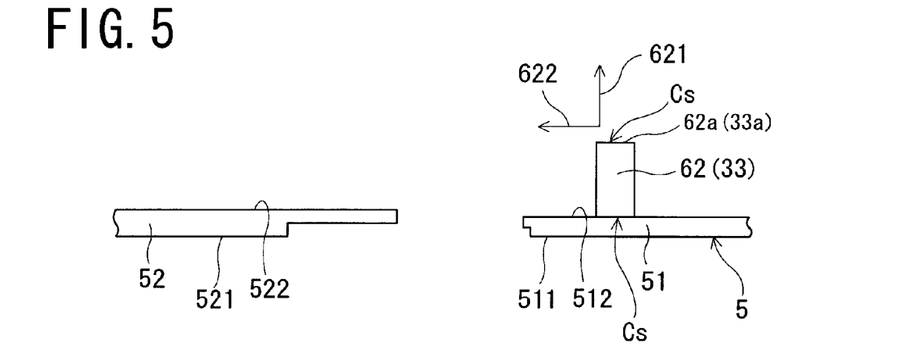
FIG. 5 is a cross sectional view for explaining a latter phase of the joining step.

FIG. 4 is a perspective view for explaining a first phase of a joining step of the manufacturing method of the solid electrolytic capacitor, and FIG. 5 is a cross sectional view for explaining a latter phase of the joining step. The joining step is performed after performing the pad forming step.

As shown in FIG. 4, in the first phase of the joining step, the pad forming member 62 is rotated by 90 degrees to change the posture of the pad forming member 62 so that the right and left pair of cutting surfaces Cs, Cs faces upward and downward. Here, the pair of cutting surfaces Cs, Cs is produced by the punching process in the pad forming step.

As shown in FIG. 5, in the latter phase of the joining step, a frame body 5 is prepared, and the frame body 5 has an anode frame 51 which is to be the anode terminal 3 and a cathode frame 52 which is to be the cathode terminal 4. The pad forming member 62 whose posture has been changed is placed on an upper surface 512 of the anode frame 51 of the frame body 5 with the pair of cutting surfaces Cs, Cs facing upward and downward.

Specifically, a table (not shown) is prepared. The table can make the pad forming member 62 stick to its surface and can change its own posture. The pad forming member 62 fastened by the fastening apparatus is transported to the table, while maintaining the posture taken immediately after the formation of the pad forming member 62 (the posture taken when the rung sections 61 are cut), and then placed on the surface of the table while maintaining the posture. After the pad forming member 62 is made to stick to the surface of the table, the pad forming member 62 is released from being fastened by the fastening apparatus. Thereafter, by changing the posture of the table, the posture of the pad forming member 62 is changed as shown in FIG. 4.

Subsequently, the pad forming member 62 whose posture has been changed is again fastened by the fastening apparatus, and thereafter the pad forming member 62 is made to stop sticking to the surface of the table. Thereafter, the pad forming member 62 is transported to the anode frame 51, while maintaining the changed posture, and then placed on the upper surface 512 of the anode frame 51 while maintaining the changed posture.

The pad forming member 62 is thus placed on the upper surface 512 of the anode frame 51 with its width direction 621 directed in a direction perpendicular to the upper surface 512 of the anode frame 51 and its thickness direction 622 directed in a direction from the anode frame 51 toward the cathode frame 52, as shown in FIG. 5 (see also FIGS. 3c and 4).

The anode frame 51 and the cathode frame 52 are each formed by performing a plating process on a surface of a frame forming member (not shown) which is made of copper and is a base material of the frames to form a plating layer (not shown) including a nickel layer, a palladium layer, and a gold layer. Various metals other than copper can be used as a material of the frame forming member. Also, various metals other than nickel, palladium, and gold can be used as a material of the plating layer.

After the pad forming member 62 is placed on the upper surface 512 of the anode frame 51, laser welding is performed on facing surfaces between the pad forming member 62 and the anode frame 51. A part of the plating layer of the anode frame 51 and a part of the pad forming member 62 are thereby melted and integrated, and as a result, the pad forming member 62 and the anode frame 51 are joined to each other electrically.

By joining the pad forming member 62 to the anode frame 51 as described above, the pad member 33 is formed from the pad forming member 62. The pad forming member 62 includes the pair of cutting surfaces Cs, Cs produced by the punching process in the pad forming step, and the cutting surfaces Cs, Cs form the joint surface of the pad member 33 joined to the anode frame 51, and a tip end surface 33a of the pad member 33 which is a joint surface joined to the anode lead 12, respectively.

Figure 6:
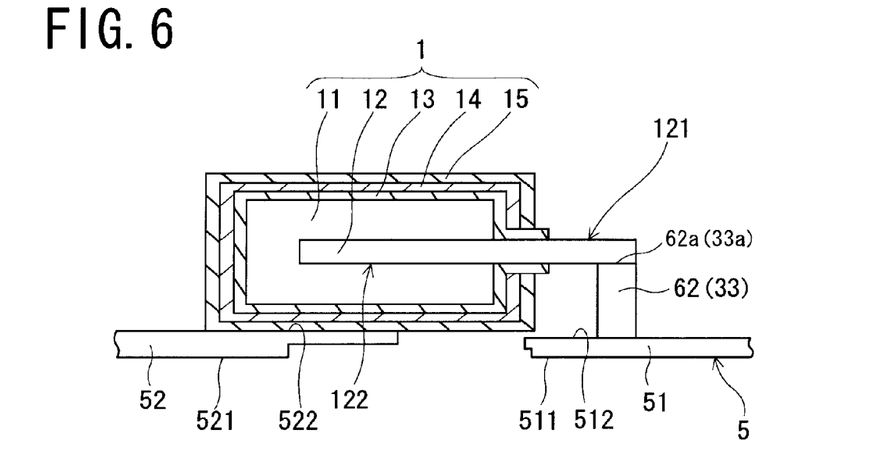
FIG. 6 is a cross sectional view for explaining a mounting step of the manufacturing method.

FIG. 6 is a cross sectional view for explaining a mounting step of the manufacturing method of the solid electrolytic capacitor. The mounting step is performed after performing the joining step. As shown in FIG. 6, in the mounting step, the capacitor element 1 is mounted on the frame body 5.

When mounting the capacitor element 1 on the frame body 5, the tip end part 121 of the anode lead 12 of the capacitor element 1 is brought into contact with a tip end surface 62a of the pad forming member 62 (the tip end surface 33a of the pad member 33), and laser welding is performed on the contact surface to fix the tip end part 121 of the anode lead 12 to the tip end surface 62a of the pad forming member 62. The anode lead 12 and the pad forming member 62 are thereby connected to each other electrically.

Concurrently, a part of the surface of the cathode layer 15 of the capacitor element 1 is bonded to an upper surface 522 of the cathode frame 52 using a conductive adhesive. The cathode layer 15 and the cathode frame 52 are thereby connected to each other electrically.

Figure 7:
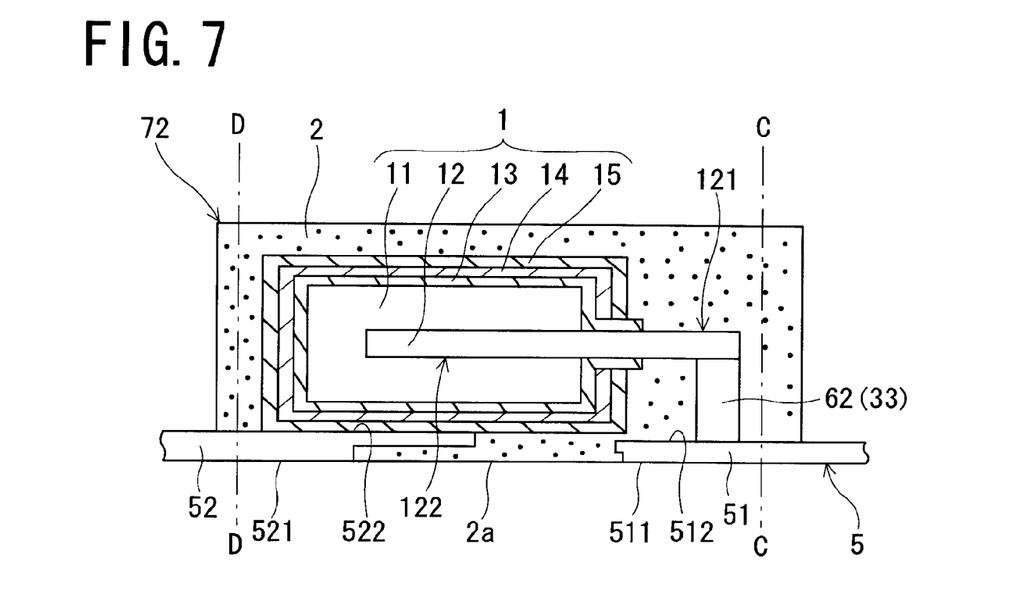
FIG. 7 is a cross sectional view for explaining an enclosure resin forming step and a cutting step of the manufacturing method.

FIG. 7 is a cross sectional view for explaining an enclosure resin forming step and a cutting step of the manufacturing method of the solid electrolytic capacitor. The enclosure resin forming step is performed after performing the mounting step. As shown in FIG. 7, in the enclosure resin forming step, the enclosure resin 2 is formed around the capacitor element 1, thereby burying the capacitor element 1, the pad forming member 62, the anode frame 51 and the cathode frame 52 in the enclosure resin 2. At this time, a lower surface 511 of the anode frame 51 and a lower surface 521 of the cathode frame 52 are exposed from a lower surface 2a of the enclosure resin 2. Thus, a block body 72 is produced in the enclosure resin forming step.

The cutting step is performed after performing the enclosure resin forming step. As shown in FIG. 7, in the cutting step, the block body 72 produced in the enclosure resin forming step is subjected to a cutting process. Specifically, the block body 72 is cut along the line C-C, thereby cutting the enclosure resin 2 and the anode frame 51 along the same plane. Further, the block body 72 is cut along the line D-D, thereby cutting the enclosure resin 2 and the cathode frame 52 along the same plane.

By performing the cutting step, respective parts of the anode frame 51 and the cathode frame 52 are cut off to form the anode terminal 3 and the cathode terminal 4, and thereby the capacitor element 1 is formed as shown in FIG. 1.

In the manufacturing method described above, the pad forming member 62 is joined to the upper surface 512 of the anode frame 51 with its width direction 621 directed in the direction perpendicular to the upper surface 512 of the anode frame 51. Therefore, the width wp0 of the pad forming member 62 corresponds to the height hp of the pad member 33 of the produced solid electrolytic capacitor. Accordingly, the height hp of the pad member 33 can be changed only by changing the width wp0 of the pad forming member 62 which is produced from the metal plate 60, and it is not necessary to change the thickness t0 of the metal plate 60.

Therefore, in the solid electrolytic capacitor of this embodiment and its manufacturing method, the height of the pad member 33 can be changed easily, compared to the conventional solid electrolytic capacitor in which it is necessary to change the thickness tc of the metal plate 140 (cf. FIG. 10b) in order to change the height hc of the pad member 114 as shown in FIG. 9.

Further, in the manufacturing method described above, the pad forming member 62 is joined to the upper surface 512 of the anode frame 51 with its thickness direction 622 directed in the direction from the anode frame 51 toward the cathode frame 52. Therefore, the thickness tp0 of the pad forming member 62 corresponds to the width wp of the pad member 33 of the manufactured solid electrolytic capacitor in a direction from the anode terminal 3 to the cathode terminal 4. Here, in the manufacturing method described above, the pad forming member 62 produced therein has the thickness tp0 which is smaller than the width wp0. Accordingly, in the manufactured solid electrolytic capacitor, the width wp of the pad member 33 is small and the space factor of the capacitor element 1 improves.

The present invention is not limited to the foregoing embodiment in construction but can be modified variously by one skilled in the art without departing from the spirit of the invention as set forth in the appended claims. For example, the configurations concerning the pad member 33 employed in the above described solid electrolytic capacitor including the lead type capacitor element 1 and the manufacturing method thereof can be applied to a solid electrolytic capacitor including a foil-like capacitor element 8 as shown in FIG. 8.

Figure 8:
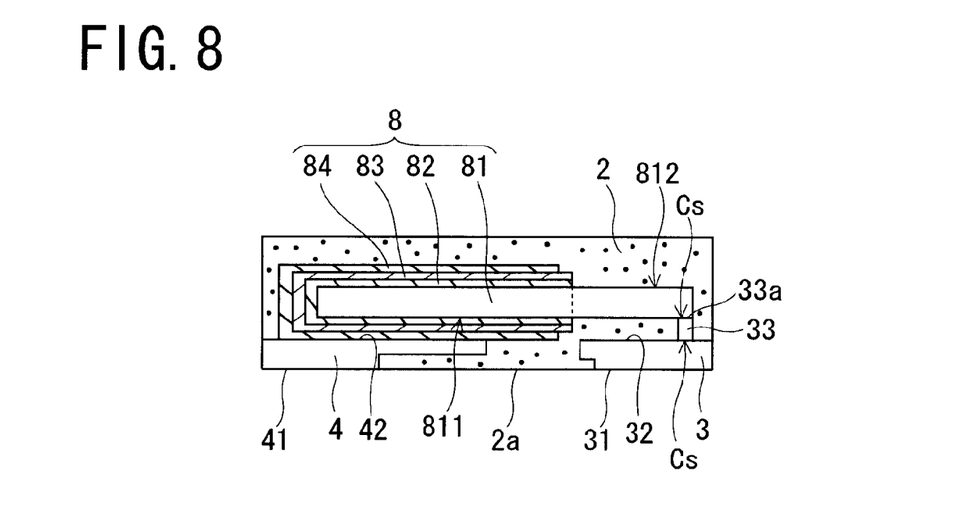
FIG. 8 is a cross sectional view showing a modification of the solid electrolytic capacitor.

As shown in FIG. 8, in the foil-like capacitor element 8, a surface of a foil-like anode body 81 includes a first area 811 where a dielectric layer 82 is formed and a second area 812 where the dielectric layer 82 is not formed. An electrolyte layer 83 is formed on the dielectric layer 82, and a cathode layer 84 is formed on the electrolyte layer 83. In the solid electrolytic capacitor shown in FIG. 8, the tip end surface 33a of the pad member 33 which is formed by the cutting surface Cs is connected to the second area 812 on the surface of the anode body 81.

In the above described solid electrolytic capacitor and the manufacturing method thereof, the pad forming member 62 which is to be the pad member 33 is formed by performing the punching process on the metal plate 60 to form the ladder plate member 6, and thereafter cutting the rung section 61 out from the ladder plate member 6. However, the present invention is not limited to this. The pad forming member 62 may be formed by performing various cutting processes on the metal plate 60.

What is claimed is:

1. A method of manufacturing a solid electrolytic capacitor, the solid electrolytic capacitor comprising: a solid electrolytic type capacitor element including a dielectric layer intervening between an anode section and a cathode section; an anode terminal electrically connected to the anode section through a pad member; and a cathode terminal electrically connected to the cathode section, the method comprising the steps of:
(a) forming at least two punched apertures in a metal plate, thereby forming a rung section between adjacent two of the punched apertures, the rung section having surfaces as a pair appearing as a result of formation of the punched apertures;
(b) cutting the rung section out of the metal plate to form the pad member, the length of the rung section corresponding to a distance between the surfaces as a pair being determined to be the height of the pad member;
(c) mounting the pad member on the anode terminal such that one of the surfaces as a pair faces the anode terminal, the step (c) being performed after the step (b); and
(d) electrically connecting the anode section to the other of the surfaces as a pair and electrically connecting the cathode section to the cathode terminal, the step (d) being performed after the step (c).

2. The method according to claim 1, wherein
in the step (a), the punched apertures are formed in the metal plate, thereby forming the metal plate into a ladder plate member having a plurality of the rung sections, and
in the step (b), each of the rung sections is cut out of the ladder plate member, thereby forming the pad member.

3. The method according to claim 1, wherein, in the step (a), the punched apertures are formed in the metal plate such that the length of the rung section becomes greater than the thickness of the metal plate.

\* \* \* \* \*